United States Patent [19]

Ogata et al.

[11] 4,142,404
[45] Mar. 6, 1979

[54] METHOD FOR PRESSURE MEASUREMENT

[75] Inventors: Yasuhiro Ogata, Fujimiya; Kenji Ariyasu, Tokyo, both of Japan

[73] Assignee: Fuji Photo Film Co., Ltd., Minami-ashigara, Japan

[21] Appl. No.: 729,627

[22] Filed: Oct. 5, 1976

Related U.S. Application Data

[63] Continuation-in-part of Ser. No. 562,325, Mar. 26, 1975, Pat. No. 4,003,245.

[30] Foreign Application Priority Data

Mar. 26, 1974 [JP] Japan .................. 49-33789

[51] Int. Cl.² ............................................. G01B 5/30
[52] U.S. Cl. ..................................... 73/762; 73/141 R; 427/150; 427/151; 427/152; 427/445
[58] Field of Search ............... 427/150, 8, 151, 445, 427/152; 428/454, 914, 307; 252/27.5; 73/88 R, 141 R

[56] References Cited
U.S. PATENT DOCUMENTS

| | | | |
|---|---|---|---|
| 2,730,457 | 1/1956 | Green et al. | 428/307 |
| 3,469,439 | 9/1969 | Roberts et al. | 260/40 R |
| 3,647,504 | 3/1972 | Hayes et al. | 428/914 X |
| 3,922,463 | 11/1975 | Masaoka et al. | 427/150 X |
| 3,955,026 | 5/1976 | Matsukawa et al. | 427/150 X |
| 4,002,060 | 1/1977 | Ogata et al. | 73/88 R |
| 4,012,538 | 3/1977 | Miyamoto et al. | 427/150 X |
| 4,012,554 | 3/1977 | Miller et al. | 427/150 |
| 4,085,949 | 4/1978 | Asao et al. | 282/27.5 |

*Primary Examiner*—Michael F. Esposito
*Attorney, Agent, or Firm*—Sughrue, Rothwell, Mion, Zinn and Macpeak

[57] ABSTRACT

A method for measuring pressures which comprises allowing a material whose pressure is to be measured to press against a recording sheet to form a color image due to the pressure, and evaluating the changes in the optical color density of the color hue of the resulting color image on the recording sheet, the color image formation due to the pressure being effected by contacting a synthetic polymer microcapsule layer containing a color former with a color developer layer under pressure, said microcapsule layer and said color developer layer being coated on the same surface of the support.

15 Claims, 2 Drawing Figures

METHOD FOR PRESSURE MEASUREMENT

CROSS REFERENCE TO RELATED APPLICATIONS

This application is a continuation-in-part of Ser. No. 562,325, filed Mar. 26, 1975, now U.S. Pat. No. 4,003,245.

BACKGROUND OF THE INVENTION

1. Field of the Invention

This invention relates to a method for measuring pressures, and more specifically, to a method for measuring pressures using microcapsules containing a substantially colorless color former (an electron donating organic compound) capable of forming a color image on contact with a color developer (an electron accepting material).

2. Description of the Prior Art

Dynamic measuring methods for various pressures of, e.g., a planar and linear nature, have gained increasing importance in recent years. Yet no simple method for measuring these pressures is known, and those methods now available involve complicated procedures. Pressures desired to be measured by such methods include, for example, the clamping pressure of bolts in machinery in general, the pressurization of automotive brakes, the pressure of molds, the mold clamping pressure, the bonding pressure between the mold wall and the resin in the mold, the molding pressure within the mold in thermoplastic and thermosetting resin fabrications, the contacting pressure of springs, the clamping planar pressures of joints of carburetors, fuel pipes, fuel tanks, etc. in fuel systems, the colliding pressure between the human body and other objects in an automobile collision, the linear and planar pressures of rubber and plastic rolls, the effective limit and effectiveness of gasket seals, the hydraulic pressure in brakes, the teeth containing pressure of gears, the planar contact pressure between solids, the contacting pressure of a cock in a cock valve, the contacting pressure between curved surfaces, the contacting pressure of rolls for steel materials during operation, the pressure between the sole of a persons foot and the floor surface, and the pressure between the human body and chairs.

Conventional pressure measuring methods, for example, involve the use of a strain gauge utilizing the relationship between stress and strain, the use of a load meter, or the use of a pressure-sensitive paint (lacquers sensitive to strain).

The use of strain gauges for the measurement of planar and linear pressures, however, requires not only various devices such as an amplifier, detector or recorder, but also techniques for operating them and complicated calculation involving material dynamics. Furthermore, this method has the defect that the material to be measured must have a smooth surface. Strain gauges are described in detail, for example, in J. Yarnell, *STRAIN GAUGE* published by Electronic Engineering Co., Ltd. (London), 1951.

The method using a pressure-sensitive paint suffers from the disadvantage of coating non-uniformity and unsatisfactory adhesiveness, and requires a complicated operation.

A load meter, on the other hand, cannot be made small in size, and the method using it is unsuitable for measurement of planar and linear pressures.

A method is also known in which a pressure-sensitive laminate is used as disclosed in U.S. Pat. No. 3,647,504. This U.S. Patent discloses a single sheet-type recording paper containing marking liquids of different colors contained in microcapsules with different wall thicknesses. Since different capsules are ruptured when different pressures are applied, the colors of the ruptured capsules naturally differ. The degree of the pressure applied can thus be evaluated from the color obtained. This method makes it possible to evaluate pressures qualitatively, but it is difficult to calculate accurately the pressures measured. Furthermore, a large amount of coloration is formed with the pressure-sensitive laminate and thus, the hands or clothes are soiled.

SUMMARY OF THE INVENTION

A first object of this invention is to provide a method for measuring pressures of a variety of materials without the need for large-scale devices, a high level of operating skill and complicated calculations.

A second object of this invention is to provide a method for measuring pressures by a simple dynamic measurement utilizing recording sheets and pressure-detecting sheets.

A third object of this invention is to provide a recording sheet capable of measuring the distribution of pressures in addition to mere pressures at individual points in a simple manner.

A fourth object of this invention is to provide a pressure measuring sheet capable of retaining the measured distribution of pressures for prolonged periods of time for future retrieval.

A fifth object of this invention is to provide a pressure-measuring recording sheet which does not soil the hands or clothes.

A sixth object of this invention is to provide a pressure-measuring recording method or sheet which does not form color stain or fog on the background thereof.

A seventh object of this invention is to provide a pressure-measuring recording method or sheet which has a wider pressure-responsibility at low pressure.

The above object can be achieved by the method of this invention which comprises allowing a material whose pressure is to be measured to press against a recording sheet to form a color image due to the pressure, and evaluating the changes in the optical color density or the color hue of the resulting color image on the recording sheet, the color formation due to the pressure being effected by contacting a synthetic polymer microcapsule layer containing a color former with a color developing layer under pressure; the microcapsule layer and the color developing layer being coated on one side of a support and in one embodiment the microcapsule containing color former and the color developer being in one and the same layer.

BRIEF DESCRIPTION OF THE ACCOMPANYING DRAWING

FIG. 1 and FIG. 2 are graphs of the relationship between the applied pressure and the optical density of the image formed on recording sheets of the present invention and a comparative example, respectively.

DETAILED DESCRIPTION OF THE INVENTION

The recording sheet used in the method of this invention comprises a support and a synthetic polymer microcapsule layer containing a color former and a color developer layer formed on the same surface of the support.

Such recording sheets are known as pressure-sensitive recording sheets or pressure-sensitive copying sheets (for example, as described in U.S. Pat. No. 2,730,457. However, in order to perform the method of this invention effectively, it is preferred to use recording sheets whose properties are different from conventional pressure-sensitive recording sheets or pressure-sensitive copying sheets. In the method of this invention, it is necessary that there should be a correlation, within the range of pressures to be measured, between the pressure applied at the time of the measurement of pressures such as planar or linear pressures and the change of the optical density or color hue of the color product formed by the color reaction. This will be explained with reference to the accompanying drawing which is a graphic representation of the relation between the pressure applied and the optical density.

Figure 1:
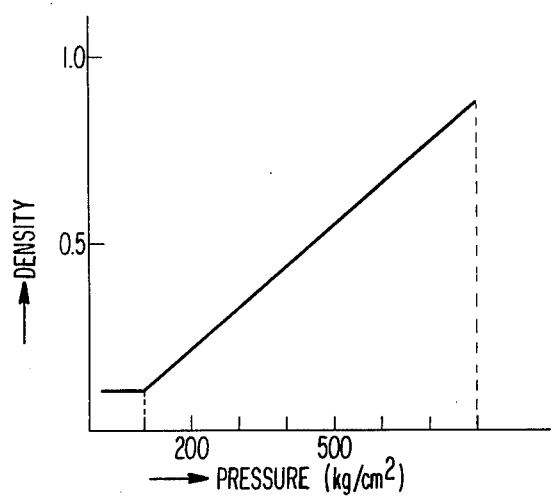
Figure 2:
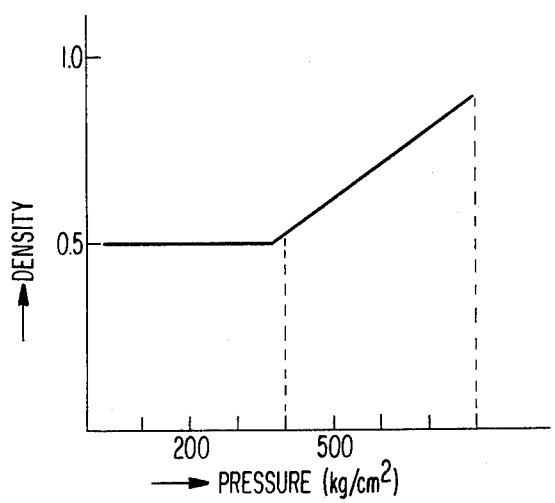

In the drawing, FIG. 2 shows the change of the optical color density versus the pressure applied per unit area, of a pressure measuring recording sheet containing gelatin microcapsules. If the range of pressures to be measured ranges from 100 Kg/cm$^2$ to 800 Kg/cm$^2$, optical color density can be obtained substantially only at pressures greater than 400 Kg/cm$^2$. Thus, hardly any correlation exists between the applied pressure and the optical color density at pressures up to 400 Kg/cm$^2$. Accordingly, pressure-measuring recording sheets employing gelatin microcapsules shown by FIG. 2 are limited in their use if the range of pressures to be measured is, for example, 400 Kg/cm$^2$ to 800 Kg/cm$^2$. Pressure-measuring recording sheets employing synthetic polymer-microcapsules of the invention as shown in FIG. 1 exhibit a straight-line correlation between the pressure applied per unit area and the optical color density within the range of pressures to be measured, for example 100 Kg/cm$^2$ to 800 Kg/cm$^2$.

The term "synthetic polymer" as used in this application in the art means a microcapsule having a synthetic polymer capsule wall. The synthetic polymer wall may be prepared by making a shell-forming polymer and an oily liquid which are inherently immiscible, miscible with each other by the aid of a low boiling solvent and a high solvent; for example the method set forth in U.S. Pat. No. 3,660,304 incorporated herein by reference.

Alternatively and preferably the synthetic shell is formed by dissolving at least two-film forming materials which react to form an oil and water insoluble high molecular weight material in the hydrophobic liquid to be encapsulated, and transferring these materials to the surface of the hydrophobic material where they react. This process is described in U.S. Pat. Nos. 2,969,330, 2,969,331, 3,429,827, 3,577,515, 3,726,804, 3,796,669, 3,886,085 and 3,900,669 which are incorporated herein by reference.

Other microencapsulating methods that can be utilized for preparing the recording sheets used in this invention include interfacial polymerization methods (as disclosed, for example, in British Patent Nos. 950,433, 1,046,469, and 1,091,141, and U.S. Pat. Nos. 3,492,380 and 3,577,515), internal polymerization methods (as disclosed, for example, in British Patent No. 1,237,498, and French Patent Nos. 2,060,818 and 2,090,862), and external polymerization methods (as disclosed, for example, in British Patent No. 989,264, and Japanese Patent Publications Nos. 12380/62, 14327/62, 29483/70, 7313/71 and 30282/71).

The synthetic polymers suitable for use in these microcapsules are well known in the art and are described in the above-referenced materials. Particularly preferred polymers are the products formed on reaction of polyisocyanate with polyamine, polyisocyanate with polyol and polyisocyanate with water. Other suitable combinations are also disclosed in U.S. Pat. No. 3,432,327.

The solvent for dissolving the color former is not limited in this invention, and all solvents known in the art can be used. Examples of such solvents are aromatic synthetic oils such as alkylated naphthalenes, alkylated biphenyls, hydrogenated terphenyls or alkylated diphenylmethanes (these compounds containing 1 to 4 alkyl groups each having about 1 to 5 carbon atoms), petroleum fractions such as kerosene, naphtha or paraffin oil, aliphatic synthetic oils such as chlorinated paraffins, vegetable oils such as cotton seed oil, soybean oil or linseed oil, or mixtures of these oils. The concentration of the color former in solution is not limited in particular.

The color former, as referred to in this application, is a substantially colorless compound which forms a color upon contact with a color developer such as a solid acid, and can also be defined as an electron-donating colorless organic compound.

The type and properties of the color former do not have substantially any effect on the present invention, and therefore, all available kinds of color formers can be used. Examples of suitable color formers are triarylmethane compounds, diarylmethane compounds, xanthene compounds, thiazine compounds and spiropyran compounds.

Specific examples of triphenylmethane compounds are 3,3-bis(p-dimethylaminophenyl)-6-dimethylaminophthalide (i.e., crystal violet lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)dimethylaminophthalide, and 3-p-dimethylaminophenyl-3-(1-methylpyrrol-2-yl)-6-dimethylaminophthalide.

Specific examples of diphenylmethane compounds are 4,4'-bis-dimethylaminobenzhydrin benzyl ether, N-halophenyl leuco auramines, and N-2,4,5-trichlorophenyl leuco auramine.

Specific examples of xanthene compounds are rhodamine-B-anilinolactam, rhodamine-(p-nitroanilino)lactam, rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, and 7-diethylamino-3-(diethylamino)fluoran.

Specific examples of thiazine compounds are benzoyl leuco methylene blue and p-nitrobenzoyl leuco methylene blue.

Specific examples of spiro compounds are 3-methyl-spiro-dinaphthopyran, 3-ethyl-spiro-dinaphthopyran, 3,3'-dichloro-spiro-dinaphthopyran, 3-benzyl-spirodinaphthopyran, 3-methylnaphtho-(3-methoxy-benzo)-spiropyran, and 3-propyl-spiro-dibenzodipyran.

The above color formers can be used either individually or as an admixture of two or more as desired.

By dissolving such a color former in a solvent, a microcapsule solution can be obtained. The microcapsules desirably have a mononuclear structure. Polynuclear microcapsules also can be used for the purpose of this invention. The size of the microcapsules is usually about 0.1 to 500 microns, preferably about 0.5 to 50 microns, and the wall thickness thereof is about 5-milimicrons to 5 microns, preferably about 10 mili-microns to 3 microns. In the present invention, microcapsules of the same sizes can be used, if desired.

Since the microcapsule solution is usually a dispersion of microcapsules, it can be directly coated on a support. With or without separation of the microcapsules from the microcapsule dispersion, a binder, for example, a latex (e.g., a styrene/butadiene rubber latex), or a water-soluble polymeric material (e.g., starch, carboxymethyl cellulose, polyvinyl alcohol, gum arabic, casein, or gelatin) can be added prior to coating. A capsule reinforcing agent can also be incorporated into the capsular solution or the microcapsule layer. Examples of suitable reinforcing agents are a fine powder of cellulose (as disclosed in U.S. Pat. No. 2,711,375), a fine powder of a polymer (as disclosed in U.S. Pat. No. 3,625,736), a fine powder of starch (as disclosed in British Patent No. 1,232,347), and microcapsules not containing a color former solution (as disclosed in British Patent No. 1,235,991). Preferably, the capsule reinforcing agent is present dispersed through the microcapsule layer or on the surface of the microcapsule layer instead of being present in a layer form.

The support on which microcapsule solution is coated, for example, can be a plastic film, a metal foil, paper, a resin-coated paper, or a synthetic paper-like sheet.

The microcapsule layer is coated at least on one surface of the support, or on the top or bottom of a color developer layer to be described, or on that surface of the support which is opposite to the color developer layer. The amount of microcapsules to be coated on the support is about 0.1 to 40 g/m$^2$, preferably 0.5 to 20 g/m$^2$.

The characteristic required of the recording sheet used in this invention is that there be a correlation (for example, in a direct or inverse proportion) between the pressure applied and the change of the optical density or the color hue of a color image formed by pressurized contact within the range or pressures to be measured. Such a correlation can be prescribed by controlling the average particle diameter of the microcapsules, the distribution of the particle diameters of the microcapsules, or the wall thickness of the microcapsules, mixing microcapsules having different average particle diameters, or controlling the amount of the capsule reinforcing agent or the water-soluble polymer to be added to the microcapsule solution, or using a combination of two or more of these techniques.

In the present application, the color developer denotes a solid acid, or, more specifically, an electron-accepting solid acid. The color developer is described in the above-cited patents, and some specific examples of color developers are clays such as acid clay, active clay or attapulgite, organic acids such as aromatic carboxylic compounds (e.g., salicylic acid), aromatic hydroxy compounds (e.g., p-t-butyl phenol, p-t-amyl phenol, o-chlorophenol, m-chlorophenol or p-chlorophenol), or metal salts of these (e.g., the zinc salts), mixtures of organic acids and metal compounds (e.g., zinc oxide), and acidic polymers such as phenol-formaldehyde resins or phenol-acetylene resins. Color developers are described, for example, in U.S. Pat. Nos. 3,501,331, 3,669,711, 3,427,180, 3,455,721, 3,516,845, 3,634,121, 3,672,935, and 3,732,120, and Japanese Patent Application Nos. 48545/70, 49339/70, 93245/70, 92246/70, 93247/70, 94874/70, 109872/70, 112040/70, 112753/70, 112754/70, 118978/70, 118979/70, and 86950/71.

The color developer can be coated on a support together with a binder. Suitable supports that can be used are those described hereinabove. Examples of suitable binders are synthetic latexes such as a styrene/butadiene rubber latex or a styrene/butadiene/acrylonitrile latex; water-soluble natural polymeric compounds, for example, proteins such as gelatin, gum arabic, albumin or casein, celluloses such as carboxymethyl cellulose or hydroxyethyl cellulose, or saccharides such as agar, sodium alginate, starch or carboxymethyl starch; water-soluble synthetic polymeric compounds such as polyvinyl alcohol, polyvinyl pyrrolidone, polyacrylic acid or polyacrylamide; and polymeric compounds soluble in organic solvents such as nitrocellulose, ethyl cellulose polyesters, polyvinyl acetate, polyvinylidene chloride, or a vinyl chloride/vinylidene chloride copolymer. These binders can also be used as a binder for the microcapsule disperion.

Known additives can also be incorporated in the color developer layer.

In another embodiment of this invention the microcapsules containing color formers and the color developer are contained in a single layer. The process by which this type of pressure-sensitive sheet is prepared is not special. The microcapsules and color developer are merely mixed in any suitable manner and the mixture is coated on a support. The ratio of microcapsule to color developer is from 1:10 to 10:1.

In performing the method of this invention, the recording sheet is placed at a particular point of a material to be measured, and pressure is applied to that point. The applied pressure results in the coloration of the recording sheet corresponding to the pressure applied. Then, the change in optical color density or color hue is read, and the pressure applied is determined. The pressure applied can be determined by means of a conventional device such as a densitometer, or by utilizing a detecting table or calibration chart separately prepared which shows the relationship between the optical color density or color hue and the pressure applied.

The pressure measuring method of this invention is very simple as compared with the conventional methods for measuring planar or linear pressures using means such as a strain gauge, a load meter or a pressure-sensitive paint, and does not require a large-sized apparatus involving an amplifier, a detector and a recorder. The operation of this method does not require a high level of skill nor a complicated calculation involving material dyanamics. In addition, the method is scarcely affected by the surface smoothness of a material to be measured, and this enables a wide range of materials to be measured by the method of this invention.

Furthermore, most conventional methods are directed to the measurement of pressures at individual points, but the method of pressure measurement according to the present invention makes it possible to measure a wide range of distribution of pressures such as linear or planar pressures. Moreover, the pressure distribution can be retained for prolonged periods of time in a clean recording sheet, and there is no likelihood of soiling the hands or clothes by the recording sheet.

The following Examples are given to illustrate the invention in greater detail and to demonstrate how feasible the pressure measuring method of this invention is.

In these Examples, all parts, percents, ratios and the like are by weight unless otherwise indicated.

The microcapsule coating solutions and the color developer solutions used in these Examples were prepared by the following procedures.

PREPARATION OF MICROCAPSULE COATING SOLUTION A

Acid-treated pigskin gelatin (10 parts) and 10 parts of gum arabic were dissolved in 400 parts of water at 40° C., and 0.2 part of turkey red oil was added as an emulsifier. A color former oil (40 parts) was dispersed in the solution, and the particle diameter of the microcapsules was adjusted to 2 to 3 microns on the average. The color former oil was a solution of crystal violet lactone in an oil comprising 4 parts of diisopropylnaphthalene and 1 part of kerosene in a concentration of 2%. Water at 40° C. was added to the dispersion, and the amount of the entire dispersion was adjusted to 900 parts. The dispersion was stirred continuously. At this time, care was taken so that the temperature of the dispersion did not decrease below 40° C. Then, a 10% acetic acid aqueous solution was added to adjust the pH of the dispersion to 4.0 to 4.2 and thus to induce coacervation. Stirring was further continued, and after 20 minutes, the dispersion was cooled with ice water to gel the coacervated membranes deposited around the oil droplets. When the temperature of the liquid reached 20° C., 7 parts of a 37% aqueous formaldehyde solution was added. When the temperature became 10° C., 40 parts of a 7% (by weight) aqueous solution of sodium carboxymethyl cellulose was added. A 15% aqueous solution of sodium hydroxide was added dropwise to the mixture to adjust the pH of the mixture to 9. The addition of the sodium hydroxide was effected with great care. With stirring, the mixture was heated for 20 minutes to increase the temperature of the liquid to 50° C. The temperature of the mixture was further adjusted to 30° C. to produce Microcapsule Coating Solution A.

PREPARATION OF MICROCAPSULE COATING SOLUTION B

Rhodamine-B-lactam (3 parts) and 3 parts of 3-diethylamino-7-methylfluoran were dissolved in 30 parts of alkylated diphenylmethane, and 4 parts of an adduct of toluylene diisocyanate and trimethylol propane (3:1 in molar ratio), 4 parts of an adduct of hexamethylene diisocyanate and trimethylol propane, and 2 parts of an adduct of ethylene diamine and propylene oxide (3:1 in molar ratio) were dissolved in the resulting solution. The solution was dispersed in a solution of 2 parts of carboxymethyl cellulose and 2 parts of polyvinyl alcohol in 40 parts of water. The particle size of the microcapsules was adjusted to 1 to 2 microns on an average, and the temperature of the solution at the time of emulsification was set at 20° C. After the emulsification, 150 parts of water was added, and with stirring, the dispersion was heated to 70° C. The temperature of the dispersion was then adjusted to 30° C., and 10 parts of cellulose flock and 5 parts of oxidized starch were added to produce Microcapsule Coating Solution D.

PREPARATION OF COLOR DEVELOPER COATING

Sulfuric acid-treated acid clay (100 parts), 20 parts of nitrocellulose and 350 parts of ethyl acetate were kneaded for 24 hours in a ball mill to produce Color Developing Coating Solution A.

EXAMPLE 1

Microcapsule Coating Solution B was coated on a synthetic resin film support (a polyethylene terephthalate film subjected to a corona discharge treatment) in a solids content of 5 g/m$^2$ by roll coating, and then dried. Then, on top of the layer was coated Color Developer Coating Solution A at a rate of 6 g/m$^2$ (solids content, hereinafter the same), followed by drying to form a recording sheet.

The resulting recording sheet was placed in a mold for injection-molding of plastics, and allowed to form a color by pressure in order to measure the contacting pressure between the resin in the mold and the wall of the mold.

Recording sheets of the same type were separately prepared, and allowed to form colors by applying different pressures which started with 100 Kg/cm$^2$ and increased by 100 Kg/cm$^2$ respectively to form comparative samples.

The recording sheet placed in the mold was withdrawn and compared with the comparative samples. The contacting pressure between the resin in the mold and the wall of the mold could be measured from the density of the color formed.

As a result of this measurement, the pressure for injecting the resin into the mold, the flow of the resin, and the filled condition of the molding orifice, which had previously been completely unknown, became clear, and a number of items such as the designing of molds, the working and finishing of the molds, the injection pressure, the adjustment of the mold temperature, or the adjustment of the cylinder temperature could be improved or inspected.

For comparison, the above pressure was measured by setting a strain gauge (a product of Baldwin Locomotove Works) within the mold for injection molding. Since the measurement method relying on the strain gauge required a large-sized apparatus involving an amplifier, a detector and a recorder and was directed to the measurement of a pressure at a point, the pressure distribution over a wide area of the mold could not be clarified as could be determined by the pressure measurement method of this invention.

This shows that the pressure measuring method of this invention is extremely simple as compared with the method using a strain gauge, and pressure distribution over a wide area can be determined and is not confined to the measurement of pressure at individual points.

COMPARATIVE EXAMPLE 1

The same procedure as in Example 1 was repeated except that Microcapsule Coating Solution B was replaced by Microcapsule Coating Solution A to form a recording sheet.

The recording sheets of Example 1 and Comparative Example 1 were placed in a mold the pressure of which could be varied between 10 kg/cm$^2$ to 600 kg/cm$^2$. The pressure in the mold caused the formation of color the optical density of which was measured. The results are shown in the Table below.

Table

| Pressure (kg/cm²) | Density Example 1 | Density Comparative Example |
|---|---|---|
| 0 | 0.06 | 0.55 |
| 100 | 0.17 | 0.55 |
| 200 | 0.35 | 0.55 |
| 300 | 0.52 | 0.55 |
| 400 | 0.70 | 0.65 |
| 500 | 0.87 | 0.80 |
| 600 | 1.05 | 0.92 |

As apparent from the Table, the mono-sheet type recording sheet employing synthetic polymer-microcapsules (the invention) provides less fog and broader pressure-measuring responsibility (more linear relation) than the mono-sheet type recording sheet employing gelatin-microcapsules (for the comparison).

What is claimed is:

1. In a method for measuring pressures which comprises pressing a material for which a pressure measurement is desired against a recording sheet to form a color image due to the pressure and evaluating the changes in the optical color density or the color hue of the resulting color image on the recording sheet, the improvement which comprises said color image formation due to the pressure being effected by contacting a substantially colorless color former contained in synthetic polymer microcapsules with a color developer under pressure, and said microcapsules and said color developer being coated on a same side of a support thereby to form said recording sheet.

2. The method for measuring pressures of claim 1, wherein changes in optical color density with respect to the pressures are directly proportional.

3. The method for measuring pressures of claim 2, wherein said proportionality is linear.

4. The method for measuring pressures of claim 1, wherein said recording sheet is capable of being used to measure pressures ranging from about 100 to 800 Kg/cm².

5. The method for measuring pressures of claim 1, wherein said color former is a substantially colorless electron-donating organic compound and said color developer is an electron-accepting material.

6. The method for measuring pressures of claim 5, wherein said color former is a triarylmethane compound, a diarylmethane compound, a xathene compound, a thiaszine compound, a spiropyran compound or a mixture thereof and said color developer is a clay, an aromatic carboxylic acid, a metal salt of an aromatic hydroxy compound, an acidic polymer, or a mixture thereof.

7. The method for measuring pressures of claim 1, wherein said evaluation of the changes in the optical color density or the color hue of the resulting color image comprises reading the optical color density or the color hue and comparing said reading with a calibration of the optical density or the color hue changes of said recording sheet obtained with varying known pressures.

8. The method of claim 1 wherein said synthetic polymer is formed by reacting polyisocyanate with polyol.

9. The method of claim 1 wherein said synthetic polymer is a product selected from the group consisting of the product formed on reacting polyisocyanate with polyamine, polyisocyanate with polyol and polyisocyanate with water.

10. The method of claim 9, wherein said microcapsules and said developer are coated as distinct layers on the same side of the support.

11. The method of claim 9, wherein said color developer is a solid acid.

12. The method of claim 1, wherein said microcapsules and said developer are coated as distinct layers on the same side of the support.

13. The method of claim 1, wherein both said microcapsules and said developer are coated as a single layer.

14. The method of claim 13, wherein the ratio of said microcapsules to said developer is from 1:10 to 10:1.

15. The method of claim 1, wherein said color developer is a solid acid.

* * * * *